United States Patent
Soldano et al.

(10) Patent No.: US 9,768,901 B2
(45) Date of Patent: Sep. 19, 2017

(54) PLANAR LIGHTWAVE CIRCUIT ACTIVE CONNECTOR

(71) Applicants: Lucas Soldano, Milan (IT); Bardia Pezeshki, Menlo Park, CA (US); John Heanue, Boston, MA (US)

(72) Inventors: Lucas Soldano, Milan (IT); Bardia Pezeshki, Menlo Park, CA (US); John Heanue, Boston, MA (US)

(73) Assignee: KAIAM CORP., Newark, CA (US)

( * ) Notice: Subject to any disclaimer, the term of this patent is extended or adjusted under 35 U.S.C. 154(b) by 0 days.

(21) Appl. No.: 14/621,273

(22) Filed: Feb. 12, 2015

(65) Prior Publication Data

US 2016/0149662 A1  May 26, 2016

Related U.S. Application Data

(60) Provisional application No. 62/082,529, filed on Nov. 20, 2014.

(51) Int. Cl.
*H04J 14/00* (2006.01)
*H04J 14/02* (2006.01)
*G02B 6/34* (2006.01)
*H04Q 11/00* (2006.01)
*G02B 6/30* (2006.01)
*G02B 6/42* (2006.01)
*G02B 6/12* (2006.01)
*G02B 6/293* (2006.01)
(Continued)

(52) U.S. Cl.
CPC ............ *H04J 14/0212* (2013.01); *G02B 6/30* (2013.01); *G02B 6/34* (2013.01); *G02B 6/4215* (2013.01); *H04Q 11/0005* (2013.01); *G02B 6/124* (2013.01); *G02B 6/12021* (2013.01); *G02B 6/1223* (2013.01); *G02B 6/2938* (2013.01); *G02B 2006/12038* (2013.01); *G02B 2006/12061* (2013.01); *G02B 2006/12142* (2013.01); *H04Q 2011/0016* (2013.01); *H04Q 2011/0032* (2013.01)

(58) Field of Classification Search
USPC .............................................. 398/84; 385/14
See application file for complete search history.

(56) References Cited

U.S. PATENT DOCUMENTS 5,936,752 A * 8/1999 Bishop ............... G02B 6/12021
                                                    359/290
6,735,368 B2 * 5/2004 Parker .................... B82Y 20/00
                                                          385/1
(Continued)

OTHER PUBLICATIONS

Okamoto et al; 16-channel optical add/drop multiplexer using silica-based arrayed-waveguide gratings; Apr. 1995; Electronics letters vol. 31 No. 9.*

(Continued)

*Primary Examiner* — Ken N Vanderpuye
*Assistant Examiner* — Amritbir Sandhu
(74) *Attorney, Agent, or Firm* — Klein, O'Neill & Singh, LLP

(57) ABSTRACT

An assembly of waveguide wavelength multiplexers and demultiplexers, together with continuous wave (CW) laser transmitters that interface to grating couplers on a silicon photonics chip, providing CW sources, multiplexed output and optionally multiplexed input, all using a single photonic lightwave circuit (PLC).

17 Claims, 9 Drawing Sheets

(51) Int. Cl.
  *G02B 6/124*  (2006.01)
  *G02B 6/122*  (2006.01)

(56) References Cited

U.S. PATENT DOCUMENTS

| | | | | |
|---|---|---|---|---|
| 7,400,793 | B2* | 7/2008 | Tabuchi | G02B 6/12011 385/24 |
| 7,561,764 | B2 | 7/2009 | Bidnyk et al. | |
| 7,889,991 | B2 | 2/2011 | Ranalli | |
| 7,957,645 | B1* | 6/2011 | Stevens | H04B 10/272 398/63 |
| 8,971,376 | B2* | 3/2015 | Pezeshki | G02B 6/30 372/101 |
| 9,438,970 | B2* | 9/2016 | Jones | G02B 6/12019 |
| 2003/0072340 | A1* | 4/2003 | Mirov | C30B 31/00 372/39 |
| 2003/0095737 | A1* | 5/2003 | Welch | B82Y 20/00 385/14 |
| 2003/0133640 | A1* | 7/2003 | Tiefenthaler | G01N 21/648 385/12 |
| 2003/0184847 | A1 | 10/2003 | Pechstedt | |
| 2003/0228092 | A1* | 12/2003 | Chang | G02B 6/29395 385/24 |
| 2004/0033004 | A1* | 2/2004 | Welch | B82Y 20/00 385/14 |
| 2005/0135449 | A1* | 6/2005 | Sorin | H04B 10/506 372/50.1 |
| 2006/0215960 | A1* | 9/2006 | Tabuchi | G02B 6/12019 385/37 |
| 2008/0095536 | A1* | 4/2008 | Shen | G02B 6/12019 398/79 |
| 2013/0004167 | A1* | 1/2013 | Kim | G02B 6/425 398/43 |
| 2014/0010498 | A1* | 1/2014 | Verslegers | G02B 5/1861 385/37 |
| 2016/0041337 | A1* | 2/2016 | Docter | G02B 6/2938 385/11 |
| 2017/0052316 | A1* | 2/2017 | Kwon | G02B 6/12009 |
| 2017/0082801 | A1* | 3/2017 | Welch | G02B 6/12004 |

OTHER PUBLICATIONS

K. Okamoto et al. "16-channel optical add/drop multiplexer using silica-based arrayed-waveguide gratings", Electronics Letters, IEEE, Aug. 1, 1996, vol. 32, Issue 16, pp. 1471-1472.

International Search Report on related PCT Application No. PCT/US2015/061574 from International Searching Authority (KIPO) dated Mar. 25, 2016.

Written Opinion on related PCT Application No. PCT/US2015/061574 from International Searching Authority (KIPO) dated Mar. 25, 2016.

* cited by examiner

PLANAR LIGHTWAVE CIRCUIT ACTIVE CONNECTOR

CROSS REFERENCE TO RELATED APPLICATIONS

This application claims the benefit of the filing date of U.S. Provisional Patent Application No. 62/082,529, filed on Nov. 20, 2014, the disclosure of which is incorporated by reference herein.

BACKGROUND OF THE INVENTION

The present application relates generally to fiber optic communications and, more particularly, to optical communications using silicon photonic chips having optical modulators using silicon interfaced with passive planar lightwave circuits.

In the past few decades, the speed of electronic processing, powered by increasing levels of integrations and smaller gate geometries has overwhelmed the ability of these same silicon integrated circuits to transmit and receive the information that they process. More and more electrical power and chip real-estate is devoted to driving the higher capacitance lines that carry signals off the integrated circuits. Thus the bottleneck in electronics is frequently the communication between chips, modules, or systems.

At the very longest length scales, telecommunication companies use multi-wavelength communication down a single optical fiber to pack more than a hundred channels, each modulated using various techniques to transport information for thousands of kilometers. The optical line cards and transport systems are complex, large, and expensive, justified by the need for bandwidth efficiency in the very long links that they serve. Currently at the shorter distance scales of a few hundred meters to a few kilometers, the same multi-wavelength approach is used, albeit with a smaller number of channels and simple on-off (NRZ) modulation with more compact transceivers and at lower costs. In both types of multi-wavelength communications, laser sources, usually in Indium Phosphide materials systems generate the light, and the data is then imposed on the signal. In the simplest case, the drive current to the laser is changed to vary the optical output intensity, while in more complex systems a separate modulator receives a continuous optical signal from the laser and acts to vary the intensity or the phase of the light that passes through it. The latter is of course more expensive and complicated, but can be more precise, as a separate modulator can more controllably vary the properties of the light.

Recently there has been a great deal of excitement in the prospect of using silicon as the material for the modulator. The idea is that the industrial infra-structure that allows the fabrication of complex electronic integrated circuits can be leveraged to fabricate the modulators. Such technology can be useful at all length scales, from complex modulators on the silicon that can create intensity and phase modulation for efficient packing of wavelength channels in very long links (for example DQPSK modulation—Differential Quad Phase Shift Keying, used in long haul links) to simple on-off modulation to code ones and zeros (NRZ-non return to zero) in shorter links.

Perhaps the most significant issue with silicon photonics is that silicon as a material, unlike Indium Phosphide, does not possess a direct bandgap. By that we mean that electrons and holes of the lowest energy have different momentum states, and therefore cannot combine directly to generate light. In a forward biased silicon pn junction, the carriers recombine non-radiatively and thus one cannot make LEDs or lasers in silicon. Generally there have been three workarounds for this problem. The first is obviously to have the light off the chip, so a separate indium phosphide laser generates the light and the light is then coupled to the silicon chip where it is modulated and then sent out. The challenge here is of course the complexity of getting the light on and off the silicon chip, especially if multiple wavelengths or multiple sources of light are needed. The second more ambitious way is to try to incorporate the direct gap indium phosphide material on the silicon. The different lattice constant, chemistry, and processing requirements of the indium phosphide make it difficult to fabricate efficient lasers this way. Furthermore, it is impossible to test or burn-in the laser prior to assembly and the relatively poor yield of the lasers increases the cost of the entire assembly. Perhaps the ultimate solution is to try to make the silicon direct gap by adding impurities or changing the crystal through physical deformation. Needless to say, this is very challenging.

A second related issue with silicon photonics is the challenge of coupling light in and out of the chip. Even if the light-source can be integrated into the silicon, one still requires the light to exit the chip and enter an optical fiber. Silicon modulators typically use extremely small and high contrast waveguides. The core is usually made of silicon that is a few hundred nanometers in scale, and the cladding is typically silicon dioxide with a very low refractive index compared to the silicon core (1.46 vs 3.6). Thus the light is highly concentrated in a very tight waveguide. The high contrast has the advantage of being able to make tight waveguide turns, the light paths almost having the geometries of electrical wires, but also has the disadvantage of being completely mismatched to a mode in a glass optical fiber, where the contrast is typically much less than 1% between the core and the cladding. Grating couplers are frequently used to help with the alignment, but grating couplers generally work only at one wavelength and therefore limit the coupling to a single channel per port.

In current architectures where fiber optics is used to connect electronic switches, the optics is separate and usually in the form of a transceiver that is plugged in to the faceplate of the unit. Typical switches used in datacenters can have tens or even hundreds of optical transceivers that populate the front plate of the unit. One advantage of this is that the customer can easily replace faulty transceiver units at the front panel. The switch itself generally does not need to be removed or sent back to the supplier for repair in the event of faulty transceivers. However, there are many penalties with this approach. First it is difficult to cool the transceivers in the front panel. It would be much easier if the modules were mounted on a board of the switch. A second issue is that high speed signals have to travel from a switch chip, somewhere on the board, all the way to the front panel. There is frequently equalization that has to occur both on the board and also in the transceiver to compensate for distortion and electrical signal loss as the high speed data patterns travel the distance from the source into the transceiver and to the optical module.

BRIEF SUMMARY OF THE INVENTION

Aspects of the invention provide a simple and efficient method of coupling light in and out of silicon photonics chips using a PLC as an intermediate material. By fabricating waveguide multiplexers and demultiplexers in glass PLCs, multi-wavelength fibers are broken down to individual wavelengths before entering or exiting the silicon and so each grating coupler in the silicon can be used only at a single wavelength, compensating for the limited optical bandwidth of the silicon grating couplers. Furthermore, using MEMS to couple lasers into a PLC can be used in the same PLC to provide the different wavelength laser sources for the silicon modulators. Some embodiments include structure discussed combining all three functions (Multi-wavelength in for the receiver, multisources in as inputs for the modulators, and multiwavelengths out) on a single PLC and provides for a simple method of attaching the assembly to a silicon photonics chip.

Some aspects in accordance with the invention provide a silicon photonics chip having a plurality of grating couplers and a photonics lightwave circuit (PLC) positioned to couple light with the grating couplers. In some embodiments the PLC includes a plurality of waveguides and a structure for deflecting light from the waveguides towards a surface of the silicon photonic chip. In some embodiments the PLC includes an arrayed waveguide grating (AWG), such that each of the wavelengths of light coming in or out of the assembly is separated out into a plurality of individual waveguides or combined from a plurality of individual waveguides into a single waveguide. In some embodiments the grating couplers of the silicon photonics chip are configured for passing of light of the same wavelengths as the corresponding ones of the plurality of waveguides. In some embodiments the silicon photonics chip includes a first set of grating couplers for coupling light from a first set of waveguides of the PLC into the silicon photonics chip and a second set of grating couplers for coupling light from the silicon photonics chip into a second set of waveguides of the PLC. In some embodiments the PLC includes a third set of waveguides for coupling light from lasers into a third set of grating couplers of the silicon photonics chip. In some embodiments the light from the silicon photonics chip is light from the lasers. In some embodiments the silicon photonics chip impresses data onto light from the lasers. In some embodiments the silicon photonics chip impresses the light by modulation of the light. In some embodiments the modulation of the light is performed by modulators of the silicon photonics chip.

Some embodiments provide a combination of a plurality of lasers of different wavelengths that operate CW (continuously), and are coupled to silicon photonics chip that contains a plurality of silicon modulators that impress a signal on these CW wavelengths of light and a low index passive Planar Lightwave circuit that is used to multiplex the different modulated wavelengths of light emanating from the modulators, where the PLC is made is made separately using a different material system and is attached to the silicon photonics chip. In some such embodiments the individual lasers are also coupled to the PLC and from the PLC enter the silicon waveguide, where the PLC is an intermediate waveguide material. In some such embodiments the PLC also contains a demultiplexing structure that is used for a receiver circuit. In some such embodiments a single PLC is used that contains different devices, one for multiplexing the different wavelengths coming out of the modulator into a single output, one for demultiplexing the receiver, and one as an intermediate waveguide structure between the lasers and the silicon chip. In some such embodiments the light from the PLC enters and/or exits the silicon waveguide by being deflected down onto grating couplers our out of grating couplers made in the silicon wafer. In some such embodiments means of coupling light between the PLC and the silicon wafer comprises an angle polish on the edge of the PLC. In some such embodiments MEMS coupling is used to couple the light from the individual lasers ultimately to individual waveguides in the silicon that lead to the individual modulators. In some such embodiments a polarity of wavelengths is generated by a single multiwavelength source. In some such embodiments there is an addition fiber or fibers between the laser source and the silicon photonics chip, thereby enabling the replacement of the laser source in case of failure of the source. In some such embodiments the coupling from the Planar Lightwave Circuit and the silicon modulator is realized by attaching the two chips directly where one waveguide facet mates directly to the other waveguide facet (end-butt coupling).

Some aspects of the invention provide as an embodiment a planar lightwave circuit (PLC) chip, comprising a demultiplexer structure having an input and a plurality of outputs, the demultiplexer structure configured to provide light on the input to the plurality of outputs on a wavelength selective basis; a multiplexer structure having a plurality of inputs and an output, the multiplexer structure configured to provide light on the plurality of inputs to the output on a wavelength selective basis; and a plurality of waveguides, each having waveguide inputs and waveguide outputs, the waveguide outputs optimized for transmission of light into a silicon photonics chip.

Some aspects of the invention provide as an embodiment a planar lightwave circuit chip, comprising a substrate; a plurality of structures on the substrate, the structures including a first plurality of waveguides, each waveguide of the first plurality of waveguides coupling a corresponding one of a first plurality of inputs and a corresponding one of a first plurality of outputs, the first plurality of outputs being on a first side of the chip; a demultiplexer including a demultiplexer input waveguide and a plurality of demultiplexer output waveguides; and a multiplexer including a plurality of multiplexer input waveguides and a multiplexer output waveguide, the inputs of the plurality of multiplexer input waveguides being on the first side of the chip.

Some aspects of the invention provide as an embodiment a planar lightwave circuit chip, comprising a first plurality of waveguides to couple light from each of a first plurality of discrete inputs to corresponding first discrete outputs; a multiplexer structure to selectively couple light at predefined wavelengths from each of a second plurality of discrete inputs to a first single discrete output; and a demultiplexer structure to couple light from a first single discrete input to a second plurality of discrete outputs in a wavelength selective manner; means for directing light to or from the first discrete outputs and the second plurality of discrete inputs in substantially a first direction.

Some aspects of the invention provide as an embodiment a device for use in a data communication system, comprising a plurality of lasers, each laser configured to emit light about a different wavelength than other lasers of the plurality of lasers; a silicon chip including a plurality of modulators to provide modulated light signals through impression of data signals on the light emitted from the lasers; a planar lightwave circuit (PLC) chip including a first plurality of waveguides to couple light from the lasers and the silicon chip, and a wavelength selective light multiplexer to couple light modulated by the plurality of modulators of the silicon chip into a single output.

Some aspects of the invention provide as an embodiment a method of processing light useful in a communications system, comprising passing light from a multiwavelength light source through at least one waveguide of a planar lightwave circuit (PLC) and into a silicon chip; modulating the light using a plurality of modulators of the silicon chip; passing the modulated light out of the silicon chip and through a wavelength selective multiplexer structure of the PLC; and providing light output from the wavelength selective multiplexer structure to a fiber optic line.

Some aspects of the invention provide as an embodiment a device for use in a data communication system, comprising a multi-wavelength light source; a planar lightwave circuit (PLC) including a wavelength selective demultiplexer and a wavelength selective multiplexer; at least one fiber optic line coupling the multi-wavelength light source and in input waveguide of the demultiplexer of the PLC; a silicon photonics chip including a plurality of modulators; and means for directing light from output waveguides of the demultiplexer of the PLC into the silicon photonics chip for modulation by the modulators and means for directing light modulated by the modulators of the silicon photonics chip from the silicon photonics chip into input waveguides of the multiplexer of the PLC.

Some aspects of the invention provide as an embodiment a method of processing light in a communication system, comprising generating a plurality of beams of light, each beam at a different wavelength; splitting each of the beams of light into corresponding second beams of light; providing each of the corresponding second beams of light to corresponding ones of a second plurality of silicon photonics chips, each having a plurality of modulators; modulating the second beams of light using the modulators; and multiplexing beams of modulated light by a plurality of multiplexers, each multiplexer receiving a different beam of the beams of modulated light from each of the silicon photonics chips.

These and other aspects of the invention are more fully comprehended upon review of this disclosure.

BRIEF DESCRIPTION OF THE FIGURES

Aspects of the disclosure are illustrated by way of examples.

DETAILED DESCRIPTION

Figure 1:
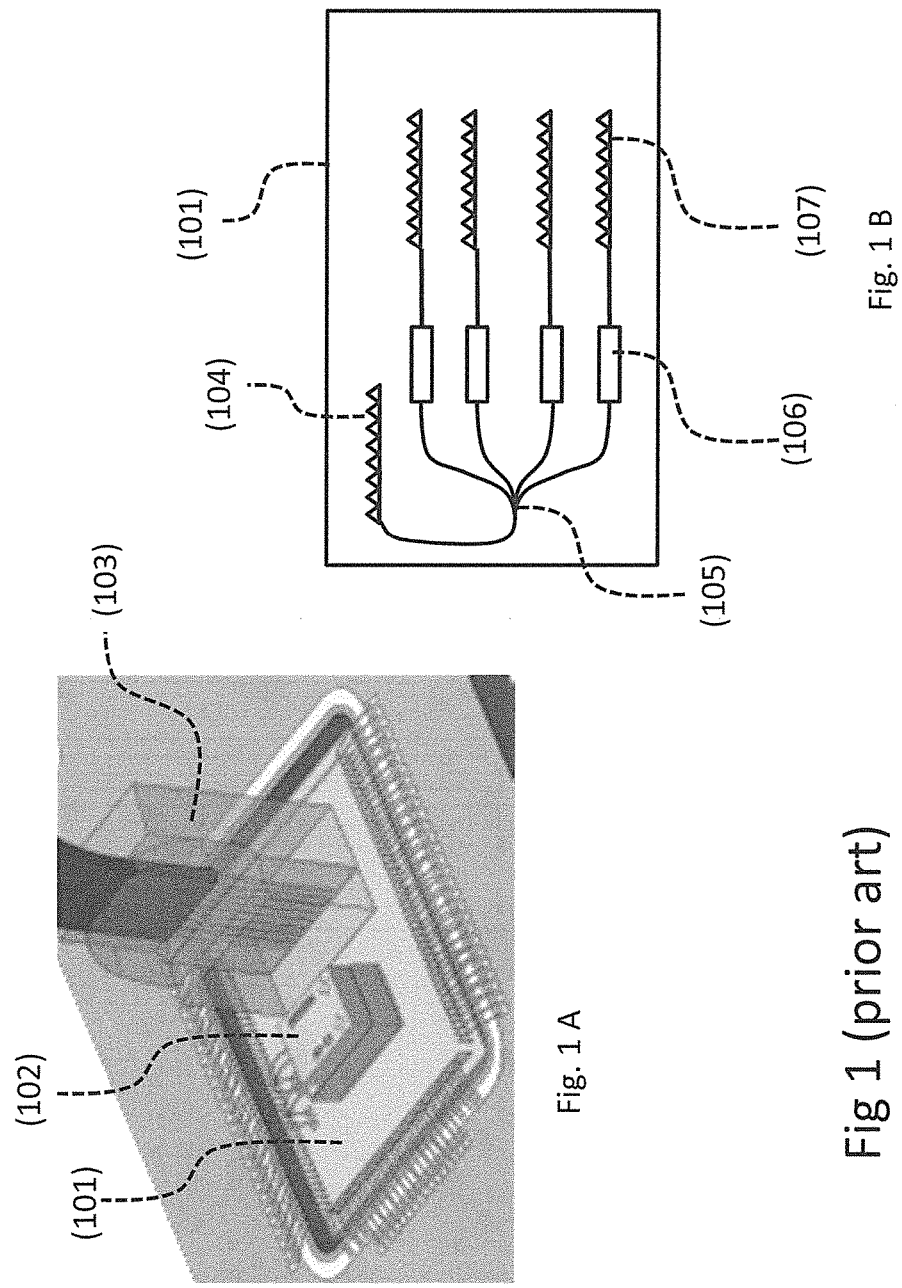
FIGS. 1A and 1B (prior art) show the design of a 4 lane silicon photonics transmitter that needs a ribbon fiber, with one modulated channel per fiber and all four fibers operating at the same wavelength.

Silicon modulators are readily fabricated using standard processes in foundries and therefore can be used to generate modulated signals that can transmit information between electronic modules. As mentioned previously, it is extremely difficult to generate light in silicon, and therefore a separate light source, for example a laser, is generally needed that provides light coupled into the silicon photonics chip with the modulators. Similarly, the modulated light is coupled out of the chip and into fiber(s) to transmit the information. One way of coupling light in and out of very tight silicon waveguides is with a grating coupler, which can only operate efficiently at one wavelength. Given these limitations of standard silicon photonics, often a single high power external laser is used as the source for multiple modulators. As input coupling into the waveguides is challenging, coupling a single laser is simpler than coupling multiple lasers. This means that for multiple lanes, multiple fibers are needed, making the cable plant much more complicated. Even if multiple lasers were used, making a multiplexer to combine the wavelengths together is challenging in silicon photonics, so it would still be difficult to combine all the wavelengths into a single low cost fiber.

FIGS. 1A and 1B show a current implementation of silicon photonics, which exhibits many of the limitations mentioned above. FIG. 1A is a diagram of the structure, while FIG. 1B is a schematic of the different elements of the silicon photonics chip. The silicon photonics chip (101) that contains the modulators acts as the base of the optical assembly and is wirebonded to the package such that the drive voltages of the modulators can be obtained from external sources. On top of the silicon photonics chip is a small packaged laser (102). In this small assembly an InP laser diode is combined with a focusing lens, an isolator, and a turning mirror to reflect the light onto the silicon photonics chip (101). The laser beam is carefully aligned on top of a grating coupler (104) in the silicon photonics chip that couples the laser light into a small silicon waveguide. The light is then divided into 4 separate waveguides using a splitter (105). Each independent output of the splitter goes into a silicon modulator (106) and a separate output grating coupler 107 that sends the light vertically out of the silicon photonics chip. The array of four output grating couplers interface with a fiber block (103) containing a single mode fiber ribbon, which then exits the assembly. It would be preferable that such a module operate at multiple wavelengths and use only a single output fiber, As providing ribbon cabling over long lengths and with many connectors can be expensive, but as previously mentioned, this is difficult given the limitations of silicon photonics.

FIG. 1 describes prior art for only a transmitter with four lanes. Of course a larger number of lanes could carry additional information, but would need more fibers and the laser power would also have to be higher for the increased splitting loss. Similarly a receiver could also be implemented on the silicon photonics chip. In this case rather than just four output fibers, one would need eight fibers in total, four for output and four for input. The inputs would go to additional grating couplers that direct the light to four photodetectors and transimpedance amplifiers. A wavelength multiplexed system of course would only need two fibers, one for output and one for input rather than eight fibers.

Figure 2:
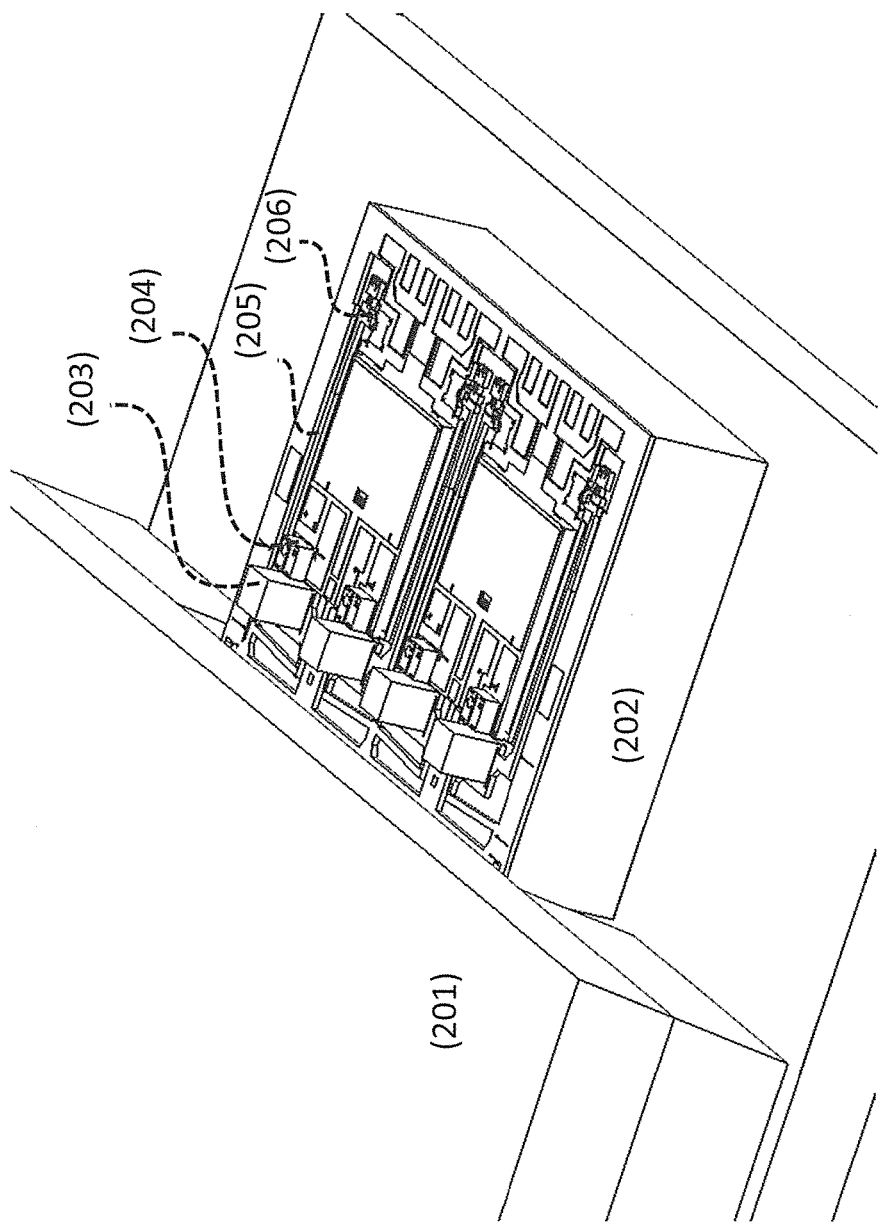
FIG. 2 (prior art) shows a MEMS-based approach of coupling individual laser chips to a glass PLC using moveable microlenses.

FIG. 2 shows prior art method of coupling light from laser chips to a PLC—a photonic lightwave circuit with waveguides made of glass rather than silicon. By using lenses between each laser and each input waveguide of the PLC, one can obtain very good coupling between the two.

The PLC chip 201 has four input waveguides (not shown) and contains a wavelength multiplexer such as an AWG (not shown) with a single output on the other side of the chip (not shown). The assembly contains four lasers 204 that emit light into four lenses 203, one lens per laser. The lens focuses the light and matches the mode to the input waveguides of the PLC 201. Given that very precise positioning is needed on these lenses, the lenses are mounted on a movable stage built on a silicon chip 202 using silicon MEMS (micro-electro-mechanical systems) techniques. Each movable stage is connected to a lever 205 that magnifies the motion of the lens. At the end of the lever is a heater 206 used to lock down the lever in the optimal position. The assembly process starts with bonding all the components on the MEMS chips 202. Each lens is then separately aligned using the lever and the levers are locked with the heaters. This process has proven itself a simple and high yield technique for aligning lasers to PLCs.

Figure 3:
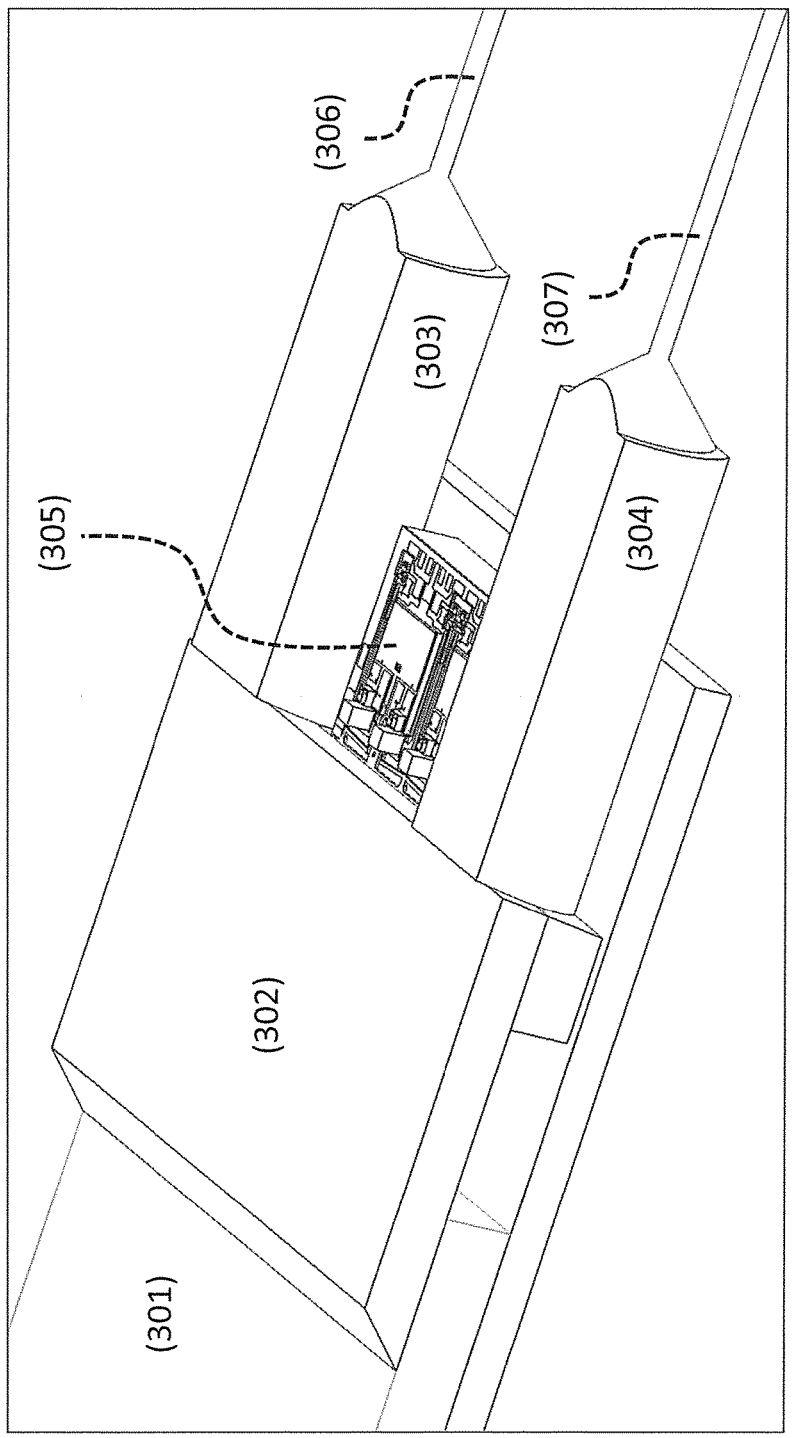
FIG. 3 shows an embodiment in accordance with aspects of the invention.

FIG. 3 shows the overall structure in accordance with aspects of the invention that overcomes at least some limitations of the prior art, that can operate for example on just two single mode fibers, one for input and one for output. Details of various of the components are further described in subsequent figures. In various embodiments, on the receive side, multiwavelength light, with many modulated channels, enters from a single fiber and is demultiplexed by a planar lightwave circuit (PLC). The demultiplexed light is passed into a silicon photonics chip. In some embodiments the demultiplexed light is directed into the silicon photonics chip. In some embodiments an angle polished side on the PLC directs the light down into grating couplers on the silicon photonics chip. On the transmit side, light from multiple continuous wave (CW) laser sources are coupled into the PLC using MEMS-based coupling. The light from the lasers passes through waveguides of the PLC to the silicon photonics chip. In some embodiments the light from the lasers is directed from outputs of the waveguides into the silicon photonics chip In some embodiments the angle polished side of the PLC directs the light into the silicon photonics chip, where each wavelength is modulated. The light is generally guided by waveguides in the silicon photonics chip to optical modulators of the silicon photonics chip, which perform the modulation. The output, modulated light, goes back through the PLC and is multiplexed, for example using a multiplexer structure of the PLC, back into a single fiber. All three functions are obtained through one PLC. In some embodiments, however, the PLC includes the waveguides and multiplexer structure for passing light from the lasers to the silicon photonics chip, and for providing light modulated by modulators of the silicon photonics chip to an optical fiber as a single beam of light, and may not include a demultiplexer for receive side operations. In such embodiments multiwavelength light on the receive side may pass through a demultiplexer of another PLC, and be provided to either the silicon photonics chip or another silicon photonics chip.

In the embodiment of FIG. 3, multi-wavelength light, for example carrying four modulated wavelengths from a distant source, enters through fiber 306. This fiber is glued into a capillary 303 that is aligned to the PLC 302. This light is then demultiplexed into four individual channels in the PLC 302, for example using a conventional wavelength sensitive structure such as an AWG. In some embodiments the PLC provides glass waveguides, which may be formed on silicon or quartz wafers, with the AWG formed on a surface of the waveguiding structure using for example lithographic techniques. The four channels are then in four separate waveguides, each waveguide carrying one wavelength of light. The waveguides terminate, in the embodiment of FIG. 3, at the other end of the PLC. In some embodiments the other end of the PLC includes a structure for directing, or deflecting, this light down into the silicon photonics chip 301. This structure could be as simple as a high reflection coated angle polish on the end of the PLC, as shown in the figure, or it could be a diffraction grating or a separate mirror or prism formed into the PLC, for example. The four channels enter the silicon photonic chip through separate grating couplers, each of which is optimized for that particular wavelength of light. For each channel, the light then goes into an integrated photodetector on the silicon photonics chip and is converted into an electrical signal and electrically amplified by a subsequent TIA (transimpedance amplifier). The silicon photonic chip may additionally include circuitry to further process the electrically amplified signal prior to passing the signal to other components of a receiver of which portions of the silicon photonic chip is a part. The further processing may include, in some embodiments, digitization and/or data recovery circuitry and other circuitry. Alternately, the silicon photonic chip may simply pass the electrically amplified signal to other components.

A MEMS coupling structure 305 couples light from lasers into the PLC. The MEMS coupling structure 305 is similar to, and in some embodiments the same as, the prior art described in FIG. 2, where four individual lasers of different wavelengths are coupled into four waveguides on the PLC 302. In some embodiments the MEMS coupling structure is as described in U.S. Pat. No. 8,346,037, entitled Micromechanically Aligned Optical Assembly, the disclosure of which is incorporated by reference herein for all purposes. Of course other techniques not using MEMS could be used to couple the light from the lasers into the PLC. The light in the PLC goes into four waveguides, that also terminate on an end of the PLC chip, and are reflected down onto grating couplers on the silicon photonics chip, using the same method as the received channels described previously. In this case, however, the four channels go, generally via waveguides in the silicon photonics chip, to four modulators of the silicon photonics chip, where data are impressed upon the signal. The modulated light signal exits the modulators and goes back to four grating couplers which deflect the modulated light signal upwards into the PLC 302, where they enter four separate waveguides. In some embodiments, it is important to note, the input grating couplers, output grating couplers and the modulators in this transmit chain are all optimized for the particular wavelength in each path. The PLC 302 also contains a wavelength multiplexer that combines all four channels together into a single waveguide. The output of this multiplexer, which again could be an AWG, is coupled to another capillary fiber assembly 304 and 307 that send the information out of the module. This output is aligned and epoxied to the PLC in the same manner as the input 303 and 306.

Figure 4:
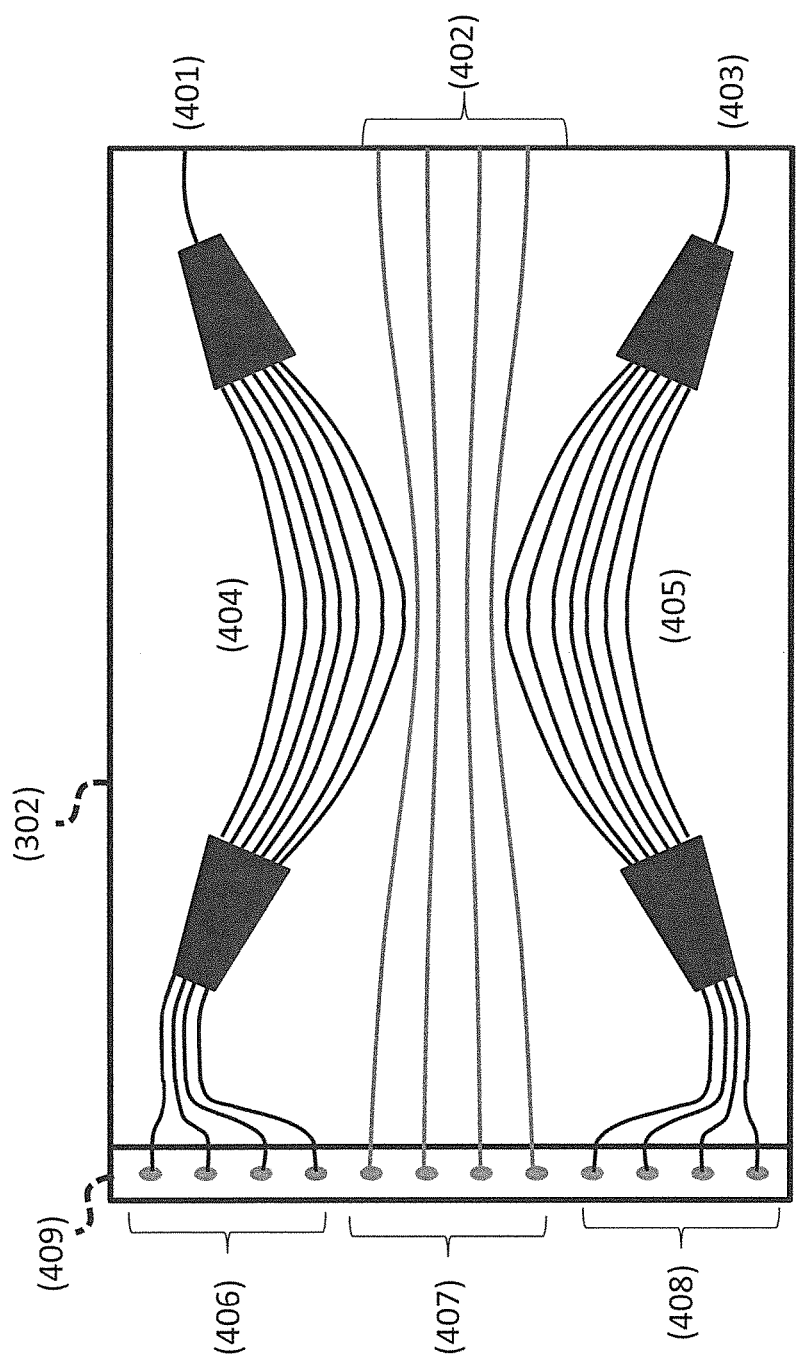
FIG. 4 shows a schematic of a glass PLC with two arrayed waveguide gratings, one is the demux for the receive, while the other is the mux for the transmit, with connecting waveguides from one side to the other bring in the CW laser light.

FIG. 4 shows an example of the PLC 302 in greater depth. On the right hand side of the figure, where the PLC interfaces to the fibers and the lasers, there are three features. At the very top of the figure is an input waveguide 401 for a demultiplexer structure 406. This input waveguide would be aligned and affixed to the capillary and fiber assembly 303/306 of the previous figure. In the center there are four input waveguides 402 that connect to the laser assembly 305. At the bottom 403 is an output waveguide that connects to the output capillary and fiber 304/307 of the previous figure. There are three main structures on the chip, illustrated as being in the middle of the chip. At the top is the demultiplexing AWG 404, at the bottom is the multiplexing AWG 405, and in the center are simple waveguide connections. On the left hand side of the chip, as illustrated in FIG. 4, at the top are the four demultiplexer output waveguides 406 that connect to the receiver. At the bottom are the four multiplexer input waveguides 408 that come from the four modulators and are subsequently multiplexed on the PLC. In the center are the four waveguides 407 that send the continuous wave (CW) signals from the laser chips into the input of the silicon modulators. In some embodiments, outputs of the demultiplexer output waveguides, inputs of the multiplexer input waveguides, and outputs of the four waveguides that send the CW signals from the laser signals direct light from the PLC towards inputs of the silicon photonics chip, in the case of the outputs of the demultiplexer output waveguides and the four waveguides, or, in the case of the inputs of multiplexer input waveguides, direct light from the silicon photonics chip into the PLC. In some embodiments a structure may be used to directionally couple light between the PLC and the silicon photonics chip. The structure may be, for example, and angled polish, or structures for directing or deflecting light such as, for example, discussed with respect to FIG. 5. In the embodiment of FIG. 4, at the left hand side of the chip, there is an angle polish to match the input acceptance angle of the grating coupler on the silicon photonics chip. This angled polish (409) shows as a vertical line in the top view. All the waveguides terminate at this angle polish and therefore the light is reflected down into the grating coupler of the silicon photonics chip. In the embodiment of FIG. 4 the angled polish is configured to direct light from or to the various waveguides in substantially the same direction.

In the figure Arrayed Waveguide Gratings are shown as an example for the demultiplexing geometry. Of course many different kinds of wavelength combiners or splitters could be used. For example, an Eschelle grating provides essentially the same functions. Wavelength dependent directional couplers using asymmetry between the waveguides, or diffraction gratings etched into the waveguides or couplers could act as filters. The material of the PLC may be glass on silicon, as previously mentioned, but in various embodiments a variety of wave materials may instead be used, for example such as silicon-on insulator (SOI) waveguides, polymer waveguides, or higher contrast SiON waveguides, and the waveguides and other structures may be on different materials such as Silicon, quartz, or fused-silica.

Figure 5:
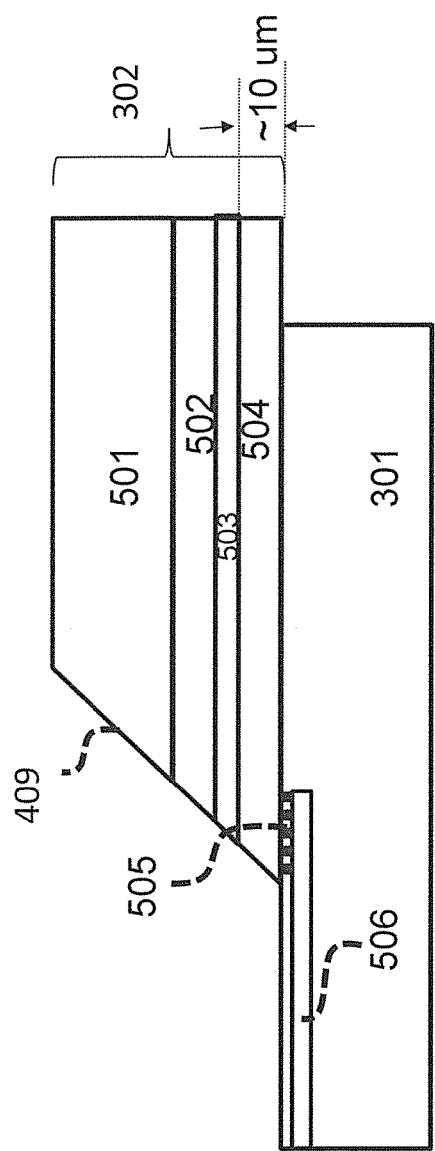
FIG. 5 shows how the angle polish on the PLC directs the light down to the silicon grating coupler.

FIG. 5 shows a detail of the side polish of the PLC and the grating coupler. The PLC wafer 302 includes a silicon substrate 501 on which various layers of glass are formed. The wafer is polished at an angle and then attached upside down to the silicon photonics chip 301. The PLC waveguides have two outer cladding regions 502 and 504, and a higher index core region 503. When the wafer is placed on the silicon photonics chip 301, the angle polish 409 causes the beam to reflect against the polished surface, diffract through the roughly 10 um of top cladding 504 and imping on the grating coupler 505. The grating coupler pitch and contrast is such that a particular wavelength couples to the silicon core waveguide 506. FIG. 5 shows an angle polish on the PLC to direct, or deflect, light into the grating couplers of the silicon photonics chip or to direct light from the silicon photonics chip into inputs of multiplexer waveguides. Of course there are other techniques of directing, or deflecting, the light into the grating coupler. For example, the PLC could have a perpendicular facet, but the light would then enter a prism that would reflect the light down. It may be easier to coat and handle a prism rather than create an angular polish on the PLC. Similarly, one could create a grating on the waveguide PLC which would direct or deflect the light much the same way that the grating in the silicon couples a vertical beam into a horizontal guided mode.

On the receiver side, a grating coupler may not be necessary. Depending on the silicon technology, the light in the glass PLC 302 could be deflected down by the side polish 409 and instead of hitting a grating coupler 505 and entering a waveguide 506, could instead hit a photodetector that would be placed in lieu of the grating coupler 505. The photodetector would then be electrically connected to the transimpedance amplifier. This may be simpler than the light first going via a grating coupler to a waveguide and then to a photodetector. Furthermore, it would resolve some polarization complexities, since the receiver generally have to be polarization insensitive and a grating coupler that works with both polarization usually is less efficient and is in fact generally a combination of two gratings that go to two different waveguides and two different detectors. In this case a single p-i-n diode would suffice.

Figure 6:
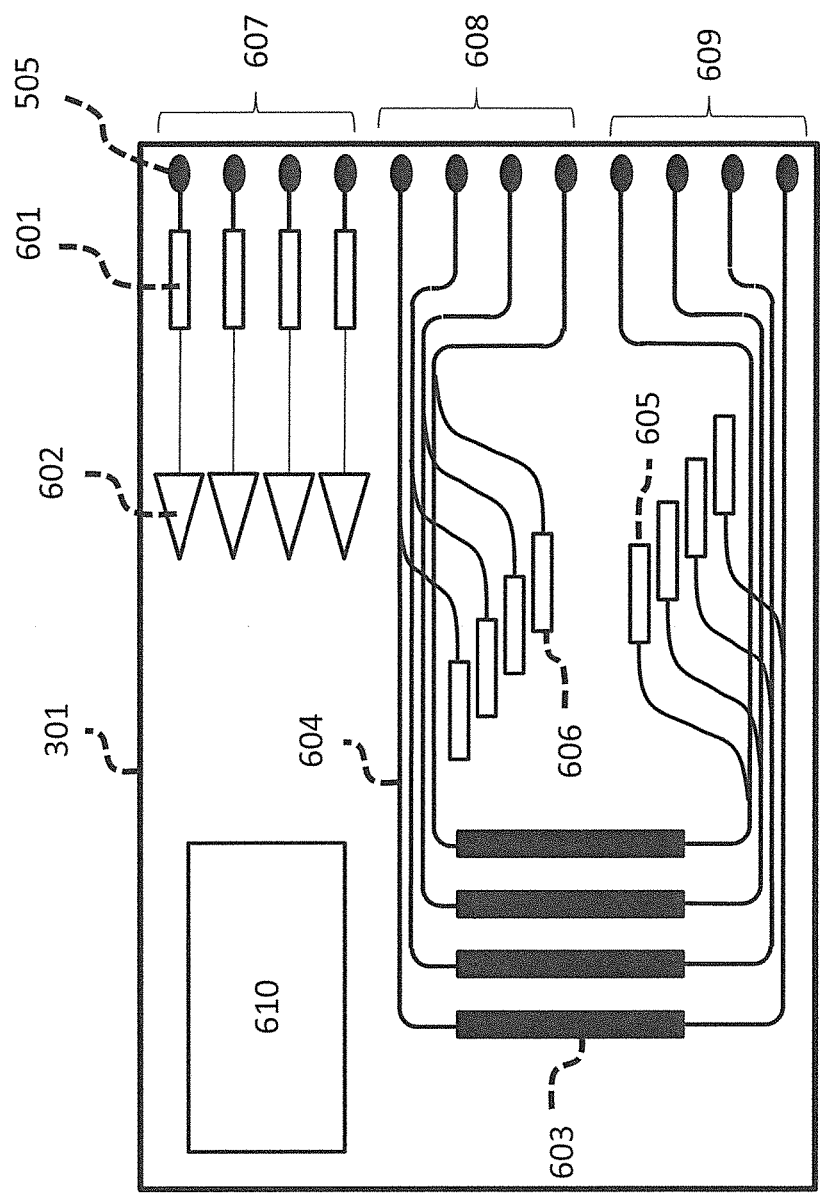
FIG. 6 shows a semi-schematic, semi-block diagram of the silicon photonics chip, with a receive chain going to high speed integrated photodetectors and amplifiers, and a transmit chain taking CW laser sources to the modulators and then back to the output, and in which integrated taps can monitor power levels and provide feedback for MEMS coupling, for example during a manufacturing stage.

FIG. 6 shows a schematic of the silicon photonics chip 301. On the right hand side of the figure are all the optical inputs and outputs, received from the PLC chip from the angle polished face and onto the grating couplers 505. There are 12 sets of inputs and outputs. A top four 607 are the receiver inputs, a middle four 608 are the inputs from the lasers which go to the modulators 603, and a bottom four in the FIG. 609 are the modulated outputs of the transmitter. The input chain of the receiver simply goes to high speed photodetectors 601 that are integrated with the silicon chip and in turn goes to transimpedance amplifiers 602. The CW laser inputs go to the modulators 603 and then exit the chip. Optionally, one may have low speed photodetectors on the chip that tap a small amount of the transmit or receive chain. Those tapping the receive chain 606 can monitor the input power and adjust the laser bias to compensate for temperature variations of laser output power or for aging. The output of these detectors are particularly useful in the MEMS alignment process, because the position of the microlenses 203 preferably make use of some sort of a signal to optimize position. The taps on the output 605, for example, could be used to monitor the health of the modulators and set off an alarm should the power vary outside the specifications. The silicon photonics chip could of course also contain electronics 610 for the control of signals or to process signals. The control and driver function can also be implemented in a separate chip that would be bonded to the main silicon photonics chip.

Currently integrated detectors in silicon do not have the performance of separately fabricated InP detectors. So one may desire to implement only the modulators on the silicon chip and have a more conventional detector path. In this case waveguides 607 would terminate on a standard InP photodetector array and either use a separate TIA or be electrically connected to the 620, the TIAs in the silicon chip.

Figure 7:
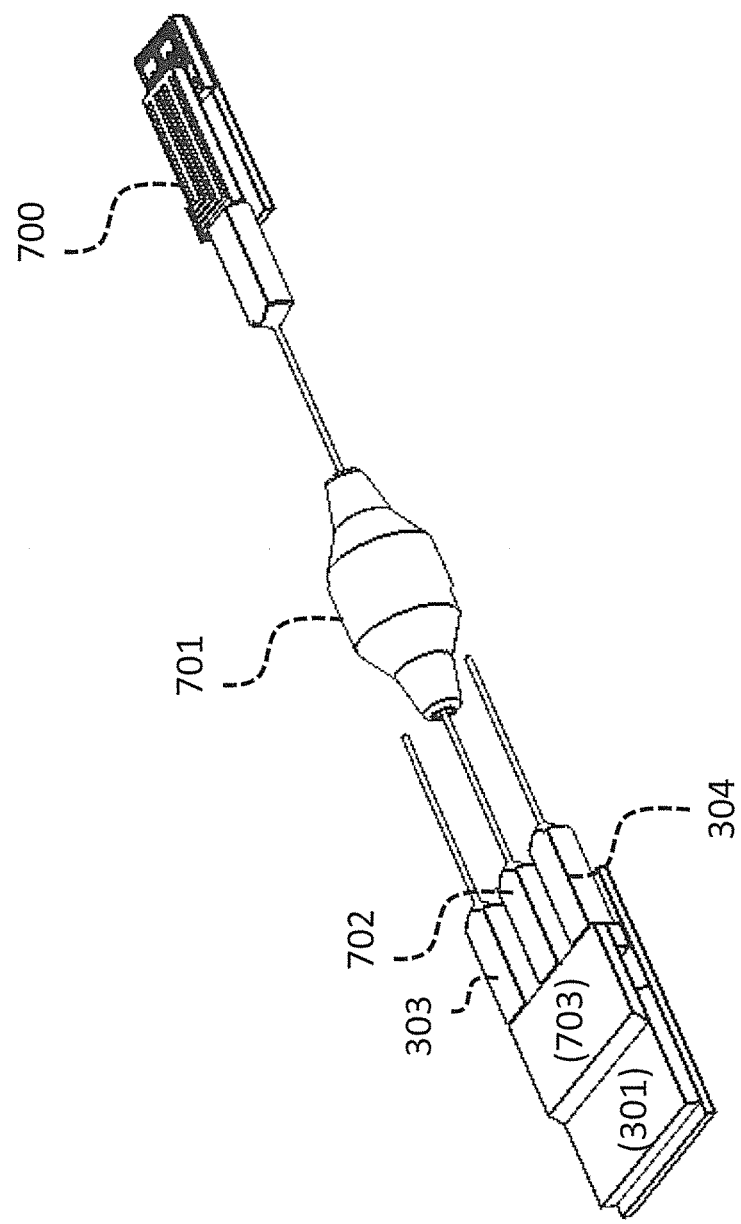
FIG. 7 illustrates a different embodiment, where the multi-wavelength CW source is fiber coupled to the PLC with a connector.

As discussed in the background section, bringing the optical signals directly to the processor has many advantages, such as reducing the need for equalization and compensation for the loss and distortion that electrical signals suffer going all the way to the front panel. There is a potential penalty which is the increased difficulty of replacing failed components. Should one of the lasers fail, it is more difficult to replace the multi-chip module on the board than a pluggable component on the faceplate. FIG. 7 addresses this issue.

In this case, a multiwavelength source is separate from an interface PLC 703, which provides light to a silicon photonics chip 301. A multi-wavelength source 700 emits radiation at multiple wavelengths simultaneously into a single output. The multiwavelength source could simply be a set of individual lasers, which may be in the form of an array of lasers on a single chip or an array of lasers on discrete chips. Alternatively, the multiwavelength source may be another type of multiwavelength source, for example a quantum dot laser with an external grating. Light of the multiwavelength source may combine into the single output, for example using a PLC having a wavelength selective multiplexer, for example provided by an AWG. In some such embodiments light from discrete wavelength laser sources may be provided to the PLC using MEMS-mounted lenses as discussed with respect to FIG. 2. The output of the multiplexer of the PLC may be coupled to a fiber or fiber pigtail, for example as discussed with respect to FIG. 3. Should the multiwavelength source fail, a technician could simply unplug or disconnect the source, which might be conveniently placed in the front panel, and replace it with a spare. The fiber from the PLC is coupled to a connector 701. Another fiber is also coupled to the connector, with the other fiber providing an optical path to a fiber assembly 707 coupled with the interface PLC 703. The interface PLC coupled to the silicon photonics chip 301 is slightly different than the PLC of FIG. 3. Rather than having two pigtailed fibers 303 and 304, as in FIG. 3, there are now three. The new pigtailed connection 702 brings in light from the multiwavelength source and the interface PLC 703 demultiplexes this, perhaps through another AWG that splits up the light from the multiwavelength source into multiple waveguides.

In some embodiments it may be preferred that the connector 701 and the fiber connecting the multiwavelength source 700 to the pigtail 702 be polarization maintaining single mode fiber. This makes the design of the grating coupler easier in the silicon photonics chip.

Conceivably one could replace the multiplexer in the multiwavelength source, the single fiber connector 701 and the additional demultiplexer in PLC 703 with a ribbon fiber and an arrayed connector, such as a single mode MTP connector. This has the advantage of lower loss, as it would remove the insertion loss of the additional multiplexer and demultiplexer, but it would add cost and complexity, since a ribbon fiber and an array connector would be needed.

Figure 8:
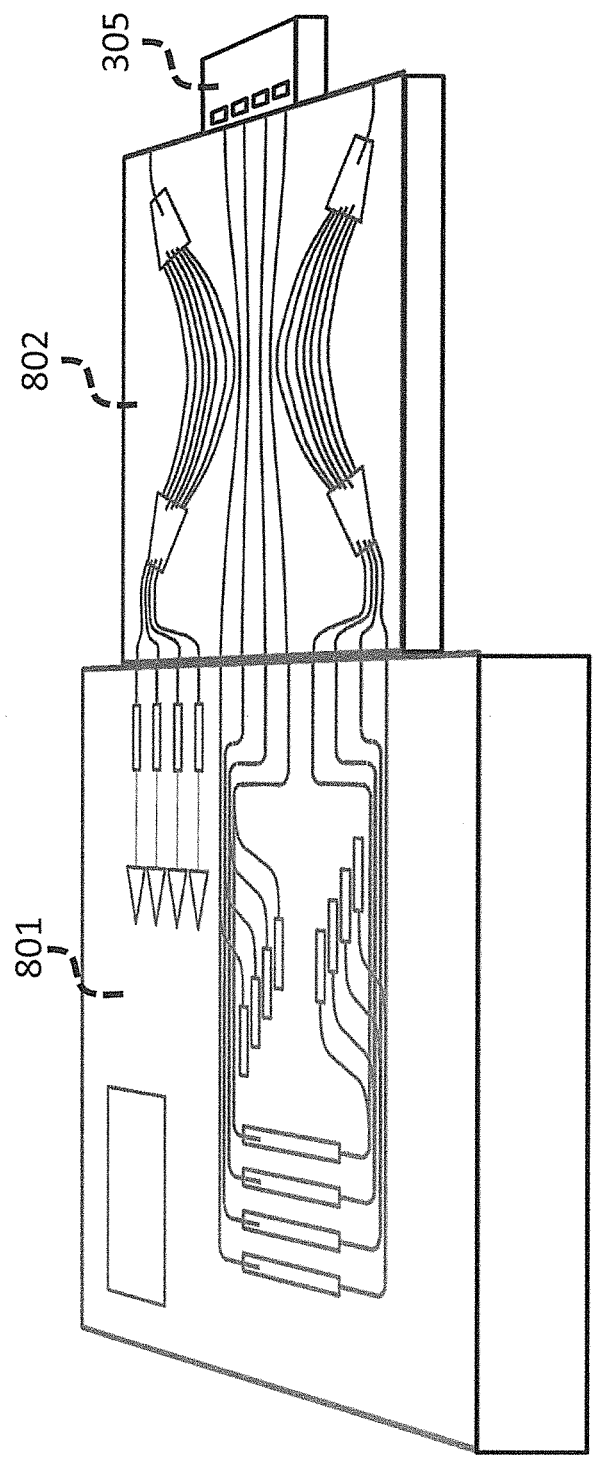
FIG. 8 illustrates an alternate embodiment where instead of grating couplers, direct end-butt coupling is used.

Embodiments discussed above generally have been discussed with grating couplers in the silicon for passing light into the silicon. For example the light in the PLC may be deflected down onto the silicon grating coupler and is then transferred into a waveguide in the silicon. Some silicon photonic technologies do not possess efficient grating couplers and/or are better interfaced using edge coupling. Though edge coupling is not generally wavelength sensitive and it is possible to make multiplexers and demultiplexers in the silicon waveguides, these silicon mux/demuxes are generally more lossy and difficult to make. The higher index of the silicon makes the wavelength of these devices extremely dependent on the geometry of the waveguides, and slight variations that occur in normal manufacturing can dramatically vary the performance of these devices. So it may be preferable to manufacture wavelength multiplexers and demultiplexers in one or more low index silica PLCs that are edge coupled to the silicon photonics chip. FIG. 8 shows such an implementation. A silicon modulator chip 801 is almost identical to the chip 301 discussed with respect to FIG. 6, except that there are no grating couplers. Instead input and output waveguides of the silicon chip terminate at an edge of the chip. The edge or facet of the chip may be coated to increase the transmission of light out of the edge of the chip. Similarly, the PLC chip 802 is almost identical to the PLC 302 discussed with respect to FIG. 4, but there is no angle polish on the edge of the chip. Like the silicon photonics chip 801, the waveguides of the PLC terminate at an edge of the PLC, which also could be polished and coated. The two chips 801 and 802 are aligned such that the waveguides interface, and the chips are attached together in some embodiments, for example with epoxy or other means. In addition to the coating applied to the ends of the chips 801 and 802, tapers could be used in the waveguides of both chips to match the size of the optical modes and further reduce coupling loss between the two chips. Lasers 305 may be coupled to the PLC, for example using a MEMS based approach discussed with respect to FIG. 2, for example.

Figure 9:
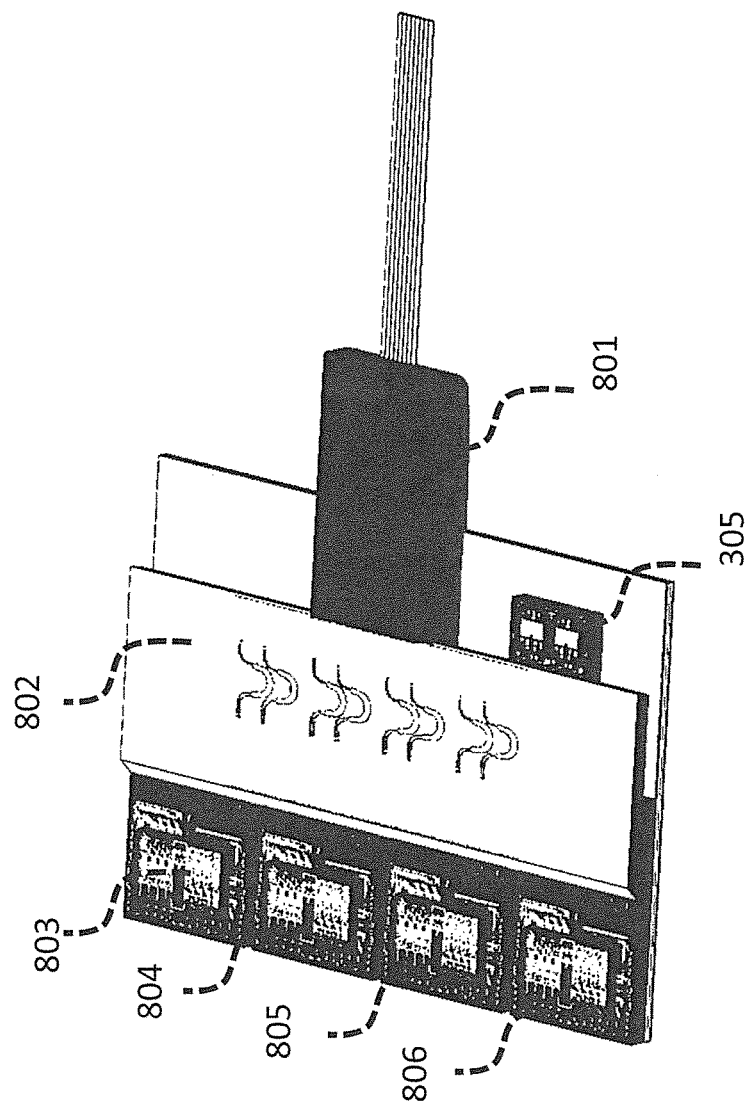
FIG. 9 illustrates an embodiment using a plurality of silicon photonics chips.

The exact implementation on the speed of the lanes, the number of lanes, and the number of lanes per silicon photonic chip may all depend on the application and yield and cost points. Implementations discussed above have been in terms of a single silicon photonics chip used with a single PLC chip. However, multiples of either, or both, chips can be implemented, for example to increase capacity. A particular useful embodiment is shown in FIG. 9, where four separate silicon photonics chips, each with 4 channels of modulators, are used with a single 16 channel PLC that directs light into an array of 4 transmit fibers, with each transmit channel carrying four wavelengths.

The light source in this case is the same as previously described. Assembly 305 has four separate lasers, each of which operates at a different wavelength. However, the PLC 802 directs each wavelength of light to a different silicon photonics chip (803-806). In various embodiments, each of the silicon photonics chips are also slightly different in that parts of each chip, in some embodiments all parts, are designed to work at a particular wavelength. A 6 dB or a divide by 4 optical splitter may take the appropriate wavelength of light from assembly 305 and splits it into four modulators of each of four silicon photonics chips, and then sends modulated light back to the PLC 802. The PLC 802 includes four multiplexers, each of which receives one different channel from each of the silicon photonics chips and muxes them together, with the multiplexers providing four outputs. These four outputs, each of which contain four wavelengths coming from the different silicon chips are coupled to a parallel single mode fiber ribbon 801. Of course the number of channels, silicon photonics chips, wavelengths and fibers in the ribbon can be optimized for particular application.

The topology discussed in this disclosure is generally very scalable, and may be extremely useful for many applications. For example, in various embodiments the chips can be used in transceivers that are now normally used in routers and switches of datacenters. Modules can also be used for midboard or embedded applications, for example with the modules on a circuit board and fiber is routed to a front panel. Further, the chips in various embodiment may be co-packaged with processor chips or integrated with processor chips. For example a switch chip or a microprocessor, instead of taking the high speed data signals to drive high current transistors that can power the capacitance of package pins and traces, instead may route the high speed signals to on-board modulators. With the implementation described, the signals are taken off the chip optically, and in various embodiments with many wavelengths in the same fiber. For example a 20 laser assembly, with light from each laser routed to four modulators, as in FIG. 8, and driving at 25 Gbaud with PAM 8 modulation would provide 1 Tb/s per fiber, or 4 Tb/s in PSM4 fiber (parallel single mode with 4 fibers in each direction). Such an optical interconnect may be used, in various embodiments, in the transport of data between chips, backplanes, or switches.

There are many variations on this structure that fall within the realm of this invention. For example, in some embodiments the number of channels can be increased to far more than four. Thirty six channels modulated at 25 Gbaud using PAM4 modulation results in a total bandwidth of 1.8 Tb/s and in various embodiments only a single input fiber is used for an input and another single output fiber for the output. In various embodiments the wavelength spacing, for example of light from the lasers, is placed close together and the entire system temperature controlled to allow for additional channels. In addition, in various embodiments arrays of lasers are used, for example on one side of the PLC, instead of individual laser dies, and an array of lenses could couple this into the PLC. Since the laser array, the PLC input waveguides and the lens array spacing are determined lithographically, the alignment would be relatively simple. Further, whether using arrays or discrete lasers, alternative methods of aligning to the PLC could be used instead of MEMS. For example, the lenses could be individually adjusted with micropositioners and glued in place. Instead of lenses, butt-coupling could be used where the laser end faced is placed in close proximity to the PLC input waveguides.

Another alternative embodiment uses a multi-wavelength laser within the main PLC instead of a number of individual lasers. The PLC incorporates another AWG to demultiplex the wavelengths of the multi-wavelength laser and separate them into individual waveguides that enter the silicon photonics chip(s) at different points.

In some embodiments optical isolators are incorporated with the microlenses, used to couple light from the lasers into the PLC, to prevent feedback into the lasers. In some embodiments optical taps are implemented in the PLC, rather than the silicon photonic chip. Additional inputs and outputs, such as straight-through waveguides, are added to the PLC in some embodiments to ease alignment and assembly of the PLC and silicon chips. Alternatively, one can increase the number of channels of an uncooled system and space them closer together. All the channels will drift up and down with temperature together, and one can use a demultiplexer to track this drift and appropriately lock on to a DWDM wavelength. This can be done in many ways. For example, the receiver can be made tunable by controlling the temperature of the demultiplexer. Since the demultiplexer does not generate heat, it can be thermally insulated from the environment and therefore only a small amount of power from a heater would vary the temperature substantially. This would tune the filter. In some embodiments this heater could be made local—for example on a polymer insert into the PLC, or it could heat the entire assembly. To track, a low frequency dither tone can be placed on one channel of the transmitter. A receiver would detect this dither tone, and generate a signal to adjust the temperature of the receiver with heater power such that the dither would be maximized at the appropriate channel.

Various aspects of the invention are useful, for example, as they provide, in some embodiments, a single chip interface to the silicon photonics and provides for all the inputs and outputs simultaneously.

Although the invention has been discussed with respect to various embodiments, it should be recognized that the invention comprises the novel and non-obvious claims supported by this disclosure.

The invention claimed is:

1. A planar lightwave circuit (PLC) chip, comprising:
   a demultiplexer structure having an input and a plurality of outputs, the demultiplexer structure configured to provide light on the input to the plurality of outputs on a wavelength selective basis;
   a multiplexer structure having a plurality of inputs and an output, the multiplexer structure configured to provide light on the plurality of inputs to the output on a wavelength selective basis; and
   a plurality of waveguides, each having waveguide inputs and waveguide outputs, the waveguide outputs optimized for transmission of light into a silicon photonics chip,
   wherein the plurality of outputs of the demultiplexer structure, the plurality of inputs of the multiplexer structure, and the waveguide outputs of the plurality of waveguides all terminate on a same side of the chip; and
   wherein the plurality of waveguides includes at least a number of waveguides equal to a number of inputs of the plurality of inputs of the multiplexer structure.

2. The planar lightwave circuit chip of claim 1, wherein the demultiplexer structure comprises an arrayed waveguide grating (AWG).

3. The planar lightwave circuit chip of claim 1, wherein the multiplexer structure comprises an arrayed waveguide grating (AWG).

4. The planar lightwave circuit chip of claim 1, wherein the demultiplexer structure comprises a first arrayed waveguide grating (AWG) and the multiplexer structure comprises a second arrayed waveguide grating.

5. The planar lightwave circuit chip of claim 1, wherein at least one of the demultiplexer structure and the multiplexer structure comprises an Eschelle grating.

6. The planar lightwave circuit chip of claim 1, wherein the input waveguide, the plurality of output waveguides, the output waveguide, the plurality of input waveguides, and the plurality of waveguides comprise glass waveguides.

7. The planar lightwave circuit chip of claim 6, wherein the waveguides are formed of layers of glass.

8. The planar lightwave circuit chip of claim 7, wherein the layers of glass are on a silicon substrate.

9. The planar lightwave circuit chip of claim 7, wherein the layers of glass are on a quartz substrate.

10. A planar lightwave circuit chip, comprising:
    a substrate;
    a plurality of structures on the substrate, the structures including:
    a first plurality of waveguides, each waveguide of the first plurality of waveguides coupling a corresponding one of a first plurality of inputs and a corresponding one of a first plurality of outputs, the first plurality of outputs being on a first side of the chip;
    a demultiplexer including a demultiplexer input waveguide and a plurality of demultiplexer output waveguides; and
    a multiplexer including a plurality of multiplexer input waveguides and a multiplexer output waveguide, the inputs of the plurality of multiplexer input waveguides being on the first side of the chip.

11. The planar lightwave circuit chip of claim 10, wherein the demultiplexer is a wavelength selective demultiplexer.

12. The planar lightwave circuit chip of claim 10, wherein the plurality of demultiplexer output waveguides are on the first side of the chip.

13. The planar lightwave circuit chip of claim 10, wherein the demultiplexer and the multiplexer each comprise an arrayed waveguide grating (AWG).

14. A planar lightwave circuit chip, comprising:

a first plurality of waveguides to couple light from each of a first plurality of discrete inputs to corresponding first discrete outputs, the first discrete outputs being on a first side of the chip;

a multiplexer structure to selectively couple light at predefined wavelengths from each of a second plurality of discrete inputs to a first single discrete output, the second plurality of discrete inputs being on the first side of the chip; and a demultiplexer structure to couple light from a first single discrete input to a second plurality of discrete outputs in a wavelength selective manner;

means for directing light to or from the first discrete outputs and the second plurality of discrete inputs in substantially a first direction.

15. The planar lightwave circuit chip of claim 14, wherein at least one of the multiplexer structure and the demultiplexer structure comprise an arrayed wavelength grating (AWG).

16. The planar lightwave circuit chip of claim 14, wherein at least one of the multiplexer structure and the demultiplexer structure comprise an Eschelle grating.

17. The planar lightwave circuit of claim 14, wherein the means for directing light to or from the first discrete outputs and the second plurality of discrete inputs in substantially a first direction comprises an edge with an angled polish.

* * * * *